United States Patent
Saldivar Carranza et al.

(10) Patent No.: US 12,175,863 B2
(45) Date of Patent: *Dec. 24, 2024

(54) METHOD OF IDENTIFYING VEHICLE TURNING MOVEMENTS AT INTERSECTIONS FROM TRAJECTORY DATA AND REALLOCATING GREEN TIME THEREFOR

(71) Applicant: Purdue Research Foundation, West Lafayette, IN (US)

(72) Inventors: Enrique Daniel Saldivar Carranza, West Lafayette, IN (US); Haoxiang Howell Li, West Lafayette, IN (US); Darcy Bullock, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,022

(22) Filed: Feb. 15, 2024

(65) Prior Publication Data

US 2024/0265805 A1   Aug. 8, 2024

Related U.S. Application Data

(63) Continuation of application No. 17/855,487, filed on Jun. 30, 2022, now Pat. No. 11,915,585.

(60) Provisional application No. 63/217,526, filed on Jul. 1, 2021.

(51) Int. Cl.
*G08G 1/07* (2006.01)
*G01S 19/42* (2010.01)
*G01S 19/52* (2010.01)
*G08G 1/01* (2006.01)

(52) U.S. Cl.
CPC ............... *G08G 1/07* (2013.01); *G01S 19/42* (2013.01); *G01S 19/52* (2013.01); *G08G 1/0145* (2013.01)

(58) Field of Classification Search
CPC .......... G01S 19/42; G01S 19/52; G08G 1/07; G08G 1/0145; G08G 1/0129; G08G 1/0112; G08G 1/095
See application file for complete search history.

(56) References Cited

U.S. PATENT DOCUMENTS

| | | | |
|---|---|---|---|
| 9,319,837 B2 * | 4/2016 | Josefiak | H04W 4/021 |
| 11,183,054 B1 * | 11/2021 | Kitagawa | G08G 1/056 |
| 2015/0215736 A1 * | 7/2015 | Josefiak | G01C 21/3867 |
| | | | 455/456.1 |
| 2018/0075740 A1 * | 3/2018 | Radomy | G08G 1/07 |
| 2019/0073899 A1 * | 3/2019 | Radomy | G08G 1/07 |
| 2020/0365015 A1 * | 11/2020 | Nguyen | G08G 1/0129 |

(Continued)

*Primary Examiner* — Sisay Yacob
(74) *Attorney, Agent, or Firm* — Piroozi-IP, LLC

(57) ABSTRACT

A method of generating an output movement layout for a traffic intersection, includes receiving intersection geographical data, establishing a center point for the intersection, receiving connected vehicle (CV) data from vehicles approaching and within the traffic intersection based on a predetermined distance from the center point, establishing an area of interest for the intersection based on the received CV data, establishing entry and exit headings for each vehicle based on the CV data, generating directional groups based on the entry and exit headings of each vehicle, and generating an output movement layout for the intersection based on the generated directional groups.

24 Claims, 17 Drawing Sheets

(56) References Cited

U.S. PATENT DOCUMENTS

2021/0394759 A1\* 12/2021 Kitagawa ........ B60W 30/18109
2022/0289210 A1\* 9/2022 Hagiwara ......... B60W 50/0098

\* cited by examiner

METHOD OF IDENTIFYING VEHICLE TURNING MOVEMENTS AT INTERSECTIONS FROM TRAJECTORY DATA AND REALLOCATING GREEN TIME THEREFOR

CROSS-REFERENCE TO RELATED APPLICATIONS

The present patent application is a continuation of U.S. patent application Ser. No. 17/855,487 filed Jun. 30, 2022 which is related to and claims the priority benefit of U.S. Provisional Patent Application Ser. No. 63/217,526 filed Jul. 1, 2021, the contents of each of which are hereby incorporated by reference in its entirety into the present disclosure.

STATEMENT REGARDING GOVERNMENT FUNDING

None.

TECHNICAL FIELD

The present disclosure generally relates to vehicular traffic management, and in particular, to a method for identifying vehicle turning movements at intersections to improve green time allocation.

BACKGROUND

This section introduces aspects that may help facilitate a better understanding of the disclosure. Accordingly, these statements are to be read in this light and are not to be understood as admissions about what is or is not prior art.

Vehicle turning movement analysis is crucial for designing traffic patterns at signalized intersections. A properly managed traffic signal can reduce congestion, enhance mobility, and decrease delays and numbers of stops. However, in a 2019 Traffic Signal Benchmarking and State of the Practice Report, the United States' traffic signal data collection practices were categorized with a grade of C, representing a challenge when trying to scale the use of traffic signal performance measures that would help improve the allocation of green time.

In many instances, manual vehicle turning movement counts remain widely used in the United States. Various efforts have been made to obtain automatic turning movements from detection technology. Different studies have been able to quantify turning movement counts from video detection. In one case one prior art researcher developed a methodology to produce automated turning movement counts based on radar technology. Inductive loop detection has also been used to automatically collect turning counts. However, since data collection is acquired manually or by using vehicle detection equipment on an intersection-by-intersection basis, data collection can represent a significant cost for governmental agencies. Further complication lies in some of these methods present challenges when different movements share lanes.

Other approaches have attempted automatic data collection. For example, prior art studies have used map matching, road geofencing, and/or geospatial references, to identify trajectory turning movements at intersections. However, these techniques present significant challenges when trying to scale for systematically analyzing hundreds or thousands of signalized intersections.

Therefore, there is an unmet need for a novel approach to provide automatic identification of vehicular turning movements from vehicle trajectories passing through an intersection without the need for additional geofencing.

SUMMARY

A method of generating an output movement layout for a traffic intersection is disclosed. The method includes receiving traffic intersection geographical data, establishing a center point for the traffic intersection, receiving connected vehicle (CV) data from vehicles approaching and within the traffic intersection based on a predetermined distance from the center point, establishing an area of interest for the traffic intersection based on the received CV data, establishing entry and exit headings for each vehicle based on the CV data, generating directional groups based on the entry and exit headings of each vehicle, and generating an output movement layout for the traffic intersection based on the generated directional groups.

Another method of automatically reallocating green time between different movements for a traffic light in a traffic intersection is also disclosed. The method includes receiving traffic intersection geographical data, establishing a center point for the traffic intersection, receiving connected vehicle (CV) data from vehicles approaching and within the traffic intersection based on a predetermined distance from the center point, establishing an area of interest for the traffic intersection based on the received CV data, establishing entry and exit headings for each vehicle based on the CV data, generating direction groups based on the entry and exit headings of each vehicle, generating an output movement layout for the traffic intersection based on the generated directional groups, identifying overcapacity or under-capacity state for each generated output movement thereby determining delay and number of stops for each vehicle in the traffic intersection, and reallocating green time between movements on a traffic light at the traffic intersection to reduce congestion and minimize vehicles during one cycle of the traffic intersection traffic lights based on any undercapacity movement at the traffic intersection.

BRIEF DESCRIPTION OF DRAWINGS

FIG. 5c is a histogram of distances traveled on FIG. 5a.

DETAILED DESCRIPTION

Figure 1A:
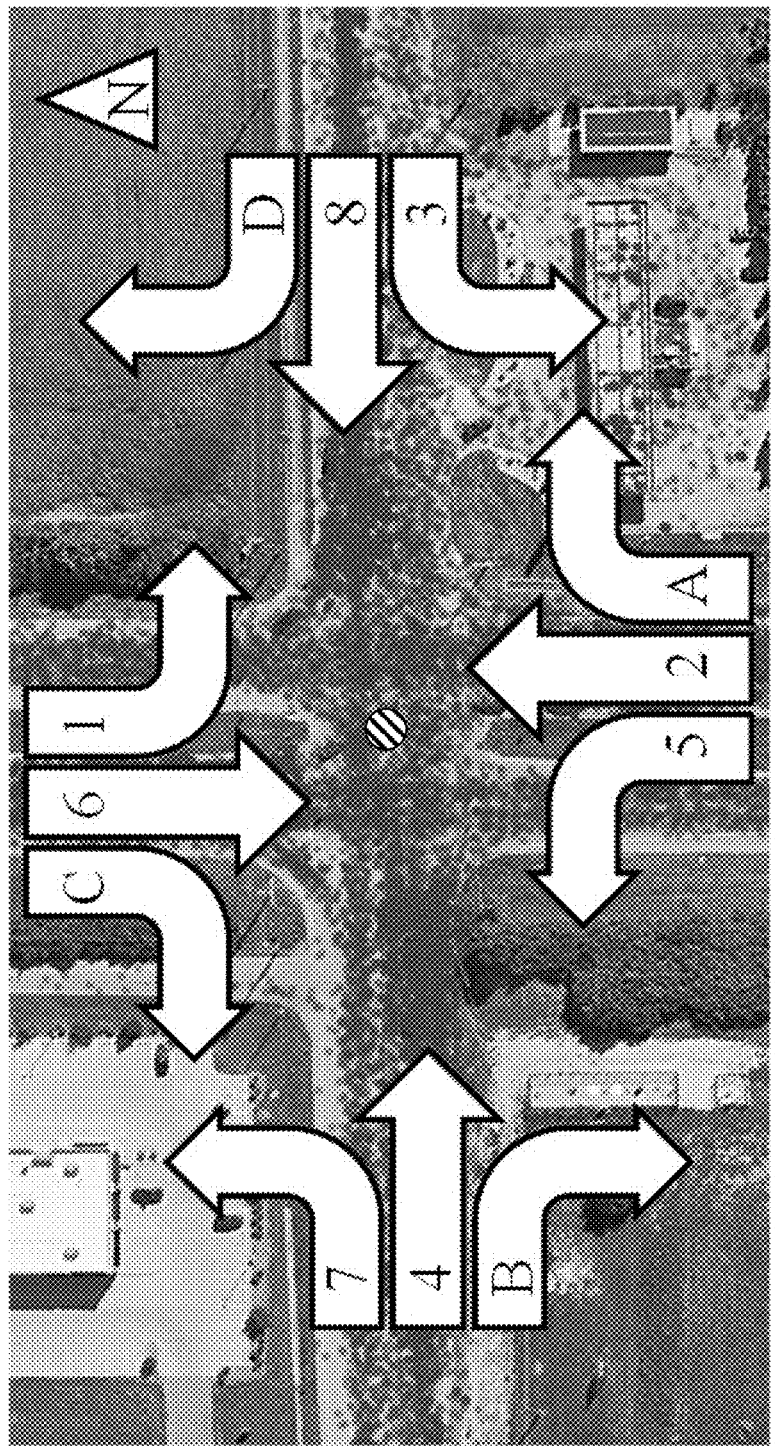
FIG. 1a is a schematic of a four-legged, bi-directional intersection depicting vehicular turning movements and vehicle global positioning system (GPS) data.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is presented herein to provide automatic identification of vehicular turning movements from vehicle trajectories passing through an intersection without the need for additional geofencing. Towards this end, the present disclosure provides an automated methodology to identify turning movements from vehicle trajectories passing through an intersection by only providing a single GPS point of an intersection as an input. After identifying trajectory turning movements with the proposed methodology, trajectory-based traffic signal performance measures, and vehicle movement counts, can be calculated with no need of additional geofencing, thus providing enhancing scalability. Further, the derived trajectory-based traffic signal performance measures can be used to identify movements where green time can be reallocated since the amount of time vehicles wait at a particular movement and the number of stops vehicles make at a particular movement can be used as variables for the reallocation of green time programmed at the intersection.

Connected vehicle (CV) data is used to generate the aforementioned methodology. The CV trajectory data includes individual vehicle waypoints with a reporting interval of 3 seconds or more frequent, with a positional accuracy within a 1.5-meter or more precise radius. Every waypoint has the following vehicular attributes: GPS location, timestamp, speed, heading, and an anonymous unique trajectory identifier. To achieve the automated trajectory turning movement identification, according to the present disclosure, three steps are performed: 1) trajectory waypoints that lie in the vicinity of the intersection are retrieved from which entry and exit vehicle headings are acquired; 2) the entry and exit headings are analyzed to identify turning movement clusters and boundaries; and 3) the entire trajectories assigned with a particular movement are filtered based on distance traveled.

In order to retrieve entry and exit trajectory waypoints that lie in the vicinity of the intersection, first turning movements of a vehicle in an intersection must be understood. There are 12 different turning movements that a vehicle can take when crossing through a four-legged, bi-directional intersection, as shown in FIG. 1a, as well as all the trajectory waypoints about a busy intersection. FIG. 1a is a schematic of a four-legged, bi-directional intersection depicting vehicular turning movements. Conventional traffic signal phase identifiers are used, where all through movements are even numbered (i.e., 2, 4, 6, and 8), all left turn movements are odd numbers (i.e., 1, 3, 5, and 7), and all right turn movements have a letter (i.e., A, B, C, and D), thus making up 12 turning movements. Below additional detail is provided of how trajectories are assigned to one of these 12 movements. It should be appreciated that from each entry into the intersection, a vehicle can take a maximum of up to 3 paths. For example, the grouping next to marker showing north (identified as "N" within a triangle) is D, 8, and 3, which means the vehicle approaching the intersection can only go straight (i.e., "8"), turn right (i.e., "D"), or turn left (i.e., "3"). The method of the present disclosure establishes the center point of the intersection (shown in FIG. 1a as a circle with crosshatch) and individual dots representing vehicle waypoints.

Figure 1B:
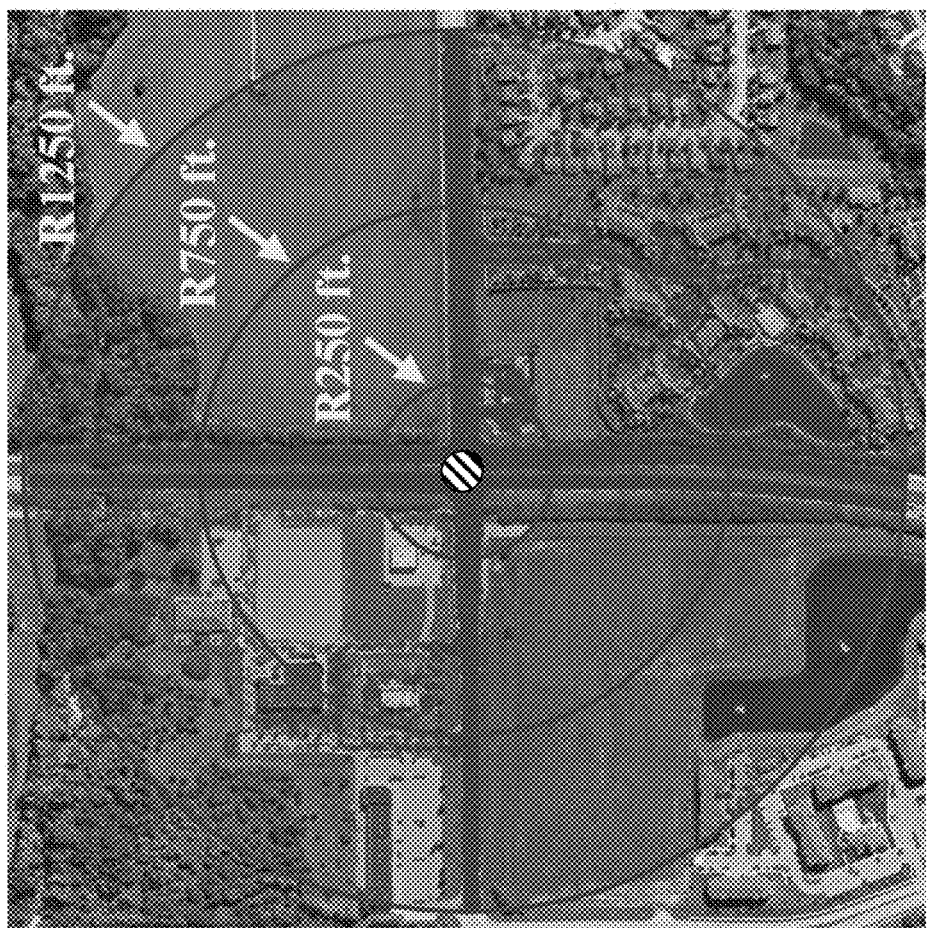
FIG. 1b is a schematic of the intersection of FIG. 1a, zoomed out to show over 84,000 trajectory waypoints that lie within a retrieval radius of 1250 feet for one day in the cross-section.

All vehicle trajectories that cross through the intersection need to be assigned a particular turning movement. A sensitivity analysis is conducted to analyze the effects that retrieval radii for entire trajectories have on the accuracy of identified movements using three different radii shown in FIG. 1b, which include 250 feet (76 meters), 750 feet (229 meters), and 1250 feet (381 meters). FIG. 1b is a schematic of the intersection of FIG. 1a, zoomed out to show over 84,000 trajectory waypoints that lie within the retrieval radius of 1250 feet for one day in the cross-section shown in FIG. 1a.

Figure 1C:
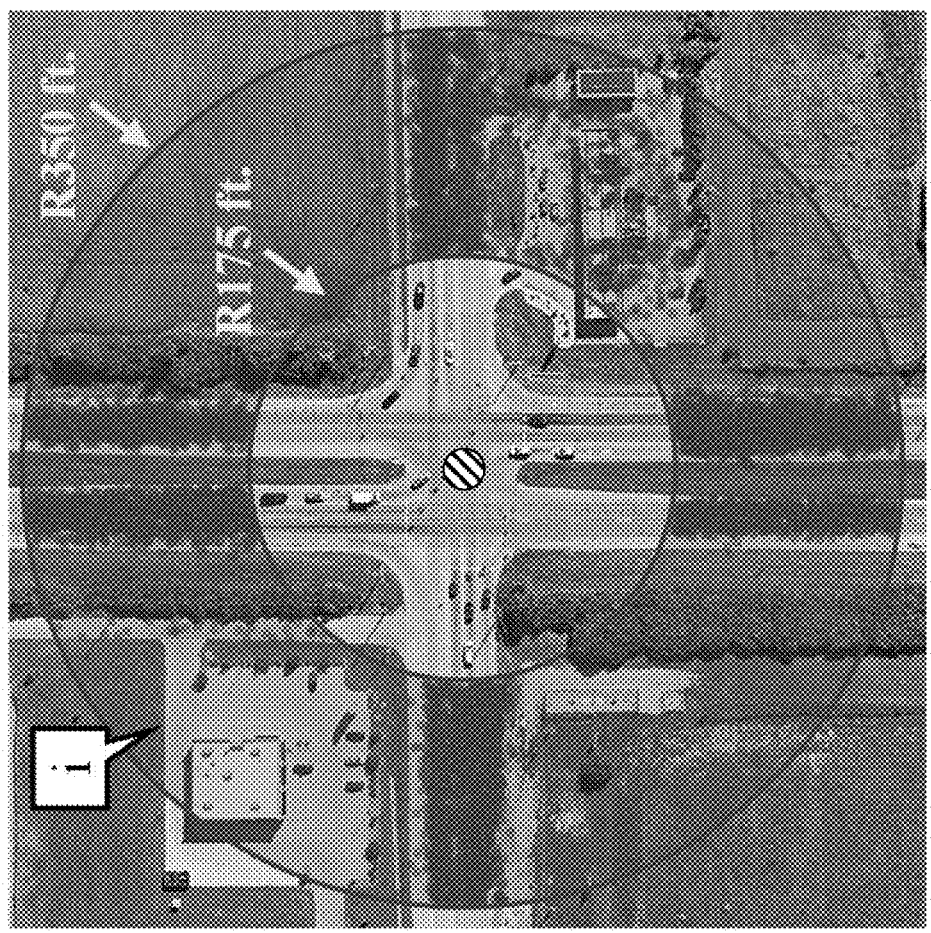
FIG. 1c is a schematic which shows a retrieval area (callout i) of FIG. 1a representing vehicles approaching and leaving the intersection utilized to acquire entry and exit headings.

The movement identification process is based on the notion that vehicles following the same turning movement would also have similar headings when entering and exiting the intersection. To identify entry and exit headings, vehicle waypoints near the intersection are retrieved. In the most general sense, a waypoint represents global positing system (GPS) type coordinates retrieved from vehicles which specify each vehicle's position, e.g., as the vehicle approaches an intersection. FIG. 1c is a schematic which shows a retrieval area (callout i) of FIG. 1a representing vehicles approaching and leaving the intersection utilized to acquire entry and exit headings. The outer retrieval radius is 350 feet (107 meters) long to thus provide an advantageous compromise on coverage and noise. The inner radius is 175 feet (53 meters) long to exclude any trajectory waypoint that is crossing through the center of the intersection. FIG. 1c also shows nearly 16,000 trajectory waypoints that lie within the retrieval area (callout i) on one day. After selecting all the trajectory waypoints that lie within the defined retrieval area in FIG. 1c, only the entry (earliest timestamp) and exit (latest timestamp) waypoints for each vehicle trajectory are kept for further analysis.

Next, the entry and exit headings are analyzed to identify turning movement clusters and boundaries. Towards this end, trajectories' entry and exit headings are first filtered. Waypoints of vehicles that appeared inside the retrieval area, e.g., between 350 ft and 175 ft, but which trajectory does not just cross the intersection; and trajectories which entry and exit waypoints do not belong to the intersection's approaches, are filtered out. To eliminate these trajectories, a vehicle's heading during entry is compared to the heading of a vector drawn from the entry location to the center of the intersection. If the vehicle's entry heading, which is provided as part of the vehicle's GPS data, is within +200 from the drawn vector's heading, then the waypoint is accepted. This ensures that the entry waypoint is one of a vehicle actively approaching the center of the intersection regardless of which of the 3 paths (i.e., straight, a right turn, or a left turn) shown in FIG. 1a the vehicle takes as the vehicle crosses (i.e., enters the intersection). Similarly, the vehicle's heading during exit is compared to the heading of a vector drawn from the center of the intersection to the exit location. If the vehicle's exit heading, again provided as part of the GPS data, is within +20° from the drawn vector's heading, then the waypoint is accepted. This ensures that the exit waypoint is one of a vehicle actively leaving the center of the intersection regardless of which of the 3 paths (i.e., straight, a right turn, or a left turn) shown in FIG. 1a the vehicle took as the vehicle crossed the intersection. If either entry or exit waypoints are rejected for a given vehicle trajectory, then both waypoints are ignored (i.e., filtered out). This filtering method is based on the assumption that the approaches at an intersection have a somewhat straight path to the center. The ±20° is provided as an example threshold. This threshold can be less, e.g., about ±10°, or more to about ±30°, depending on the geometry of the intersection. Thus, depending on the geometry of the intersection and how close in heading each of the approaching legs are to each other, the ±20° threshold may be adjusted lower or higher to accommodate tighter or larger geometries.

Figure 2A:
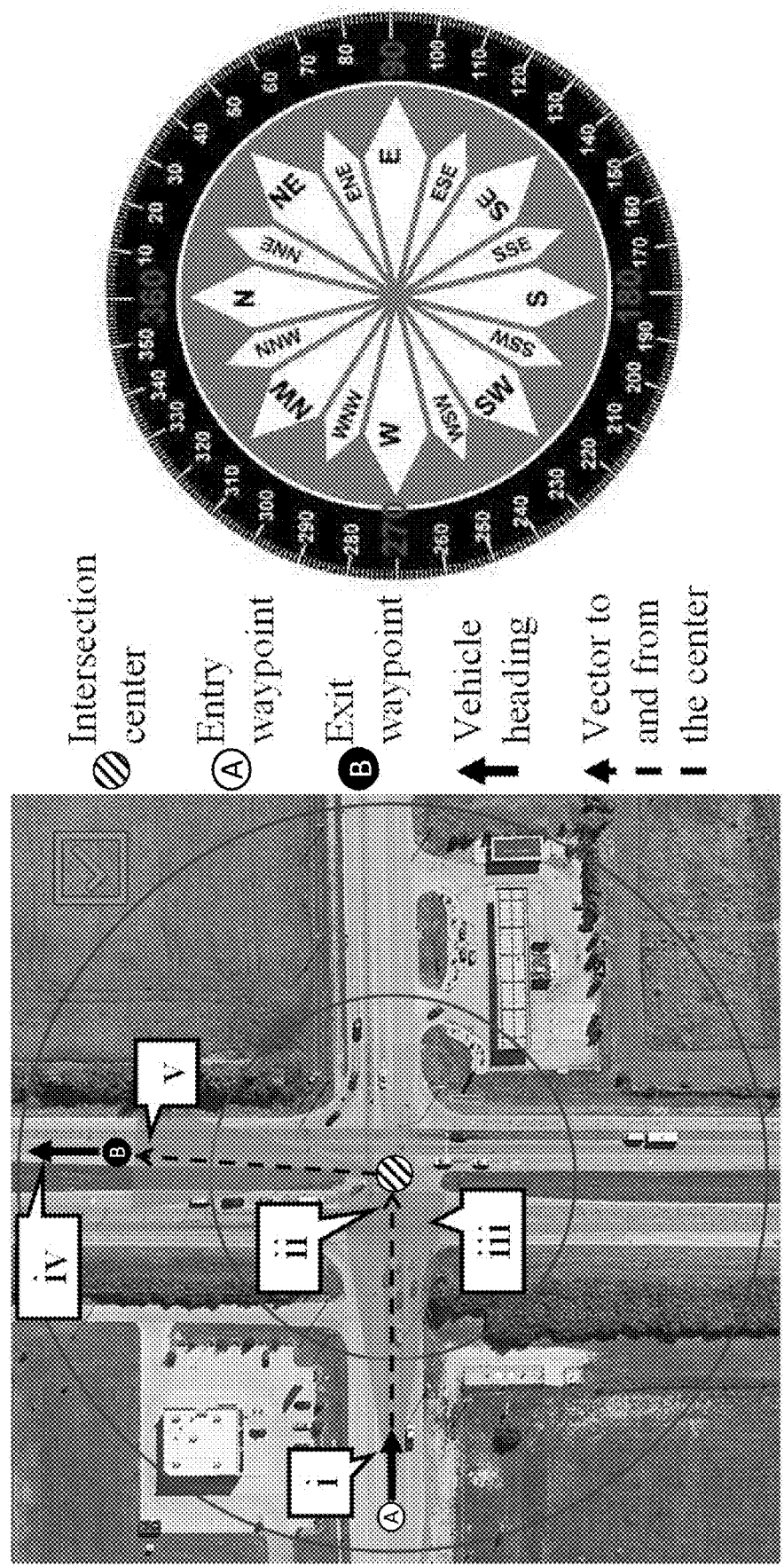
FIG. 2a is a diagram in which a hypothetical vehicle trajectory's entry and exit waypoints are accepted, according to the present disclosure.

Referring to FIG. 2a, a diagram is shown in which case a hypothetical vehicle trajectory's entry and exit waypoints are accepted. A compass is also shown in FIG. 2a to depict the way angles progress. The vehicle's entry heading is 90° (callout i, in which the vehicle's starting point into the intersection is shown with a white solid circle marked as "A") and the vector from the entry point to the center of the intersection also has a 90° heading (callout ii). Since the entry heading is within +20° from the drawn vector's heading (callout iii), the entry point is accepted. The exit waypoint has a heading of 0° (callout iv, in which the vehicle's ending point out of the intersection is shown with a black solid circle marked as "B" and the vector from the center of the intersection to the exit point has a 5° heading (callout v). Since the exit heading is within ±20° from the drawn vector's heading, the exit point is accepted. Because both waypoints are accepted, the points are kept for further analysis.

Figure 2B:
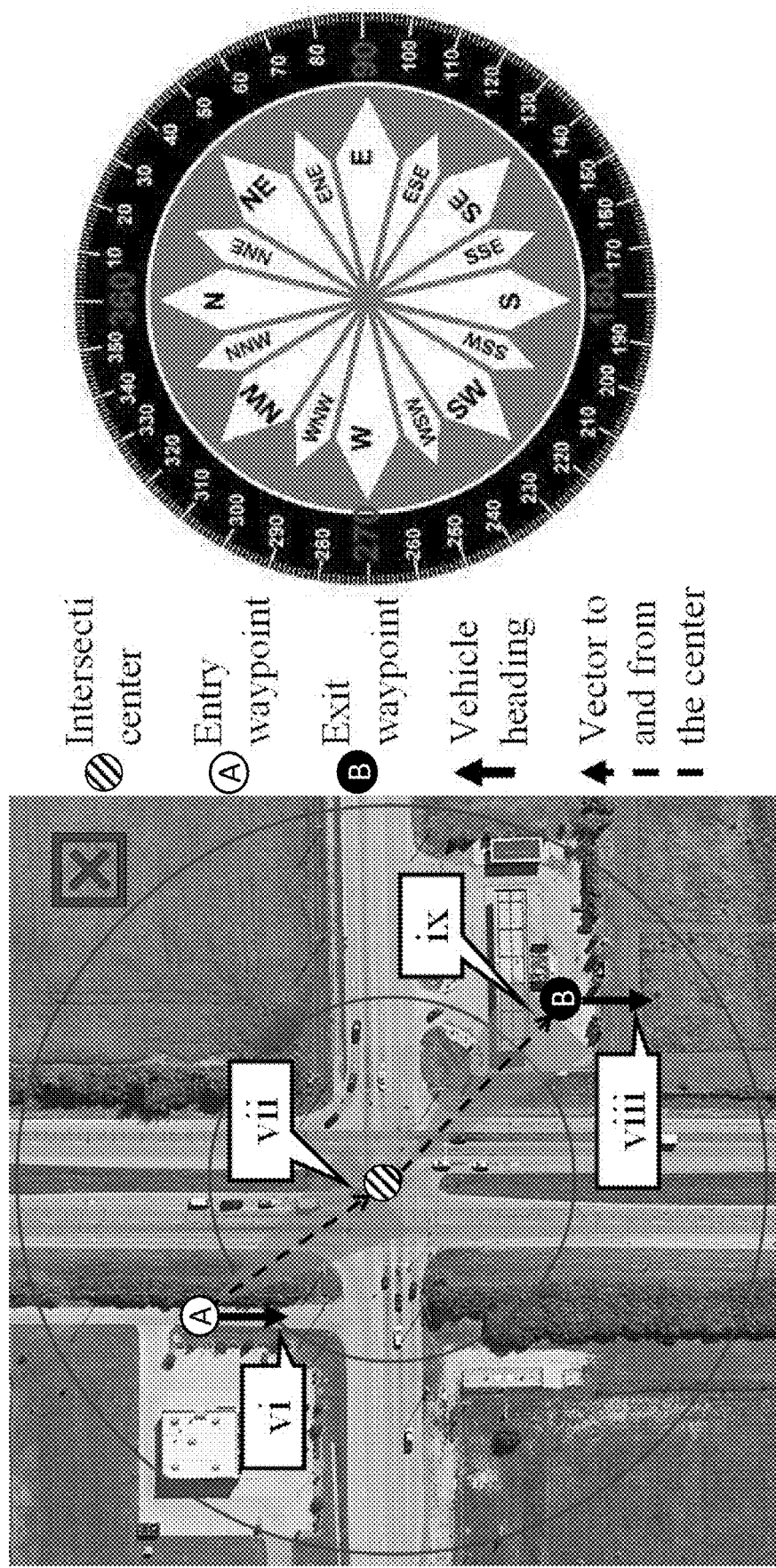
FIG. 2b is another diagram in which a hypothetical vehicle trajectory's entry and exit waypoints are not accepted (i.e., rejected), according to the present disclosure.

In contrast, referring to FIG. 2b, another diagram is shown in which case a hypothetical vehicle trajectory's entry and exit waypoints are not accepted (i.e., rejected). A compass is also shown in FIG. 2b to depict the way angles progress. For this case, the vehicle's entry heading is 180° (callout vi, in which the vehicle's starting point into the intersection is shown with a white solid circle marked as "A") and the vector from the entry point to the center of the intersection has a 145° heading (callout vii). Since the entry heading is not within ±20° from the drawn vector's heading, the entry point is rejected. The exit waypoint has a heading of 180° (callout viii, in which the vehicle's ending point out of the intersection is shown with a black solid circle marked as "B") and the vector from the center of the intersection to the exit point has a 135° heading (callout ix). Since the exit heading is not within ±20° from the drawn vector's heading, the exit point is rejected. Because at least one waypoint is rejected, both waypoints are eliminated (i.e., filtered out).

Figure 3A:
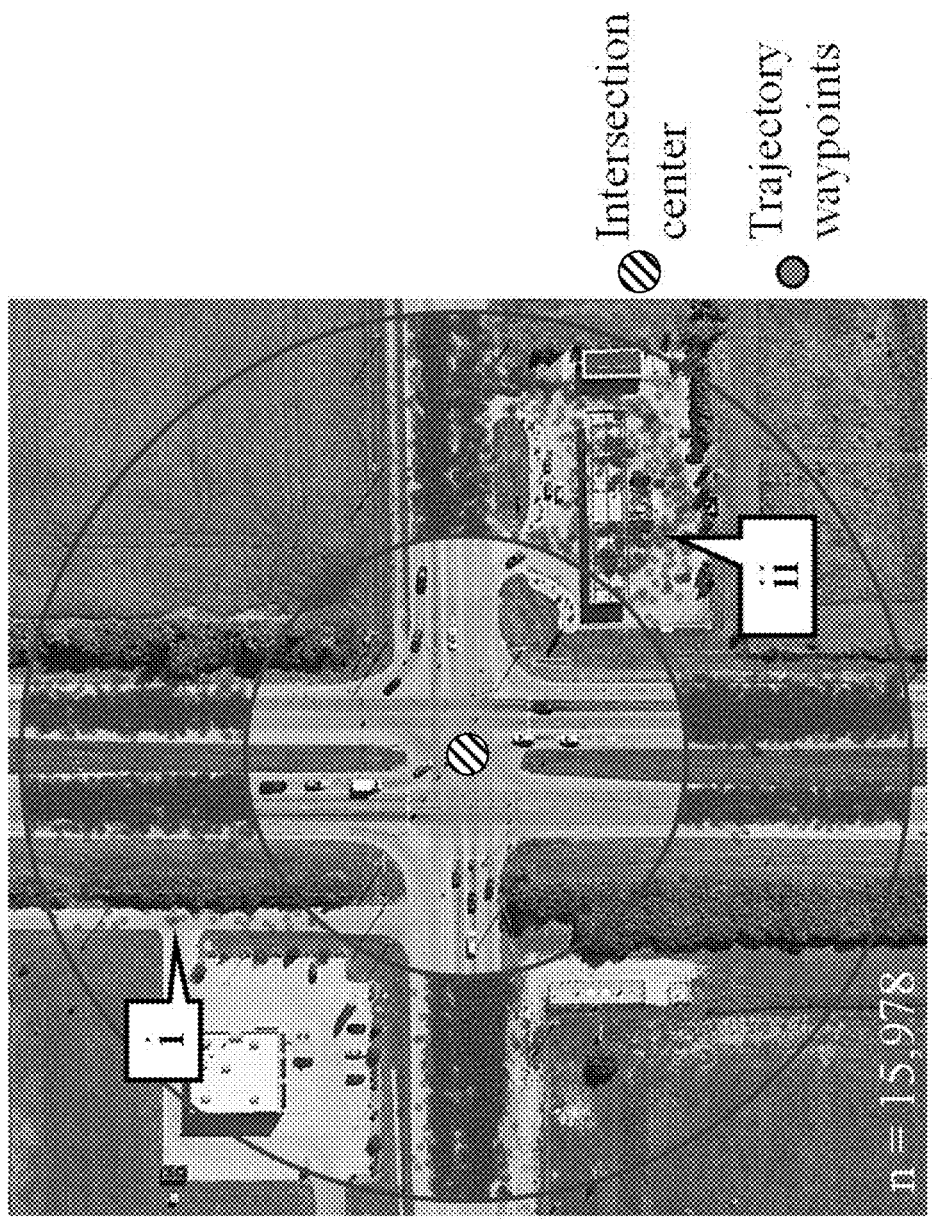
FIGS. 3a and 3b are two diagrams which show the filtering impact on waypoint selection to identify valid entry and exit datapoints, according to the present disclosure.
Figure 3B:
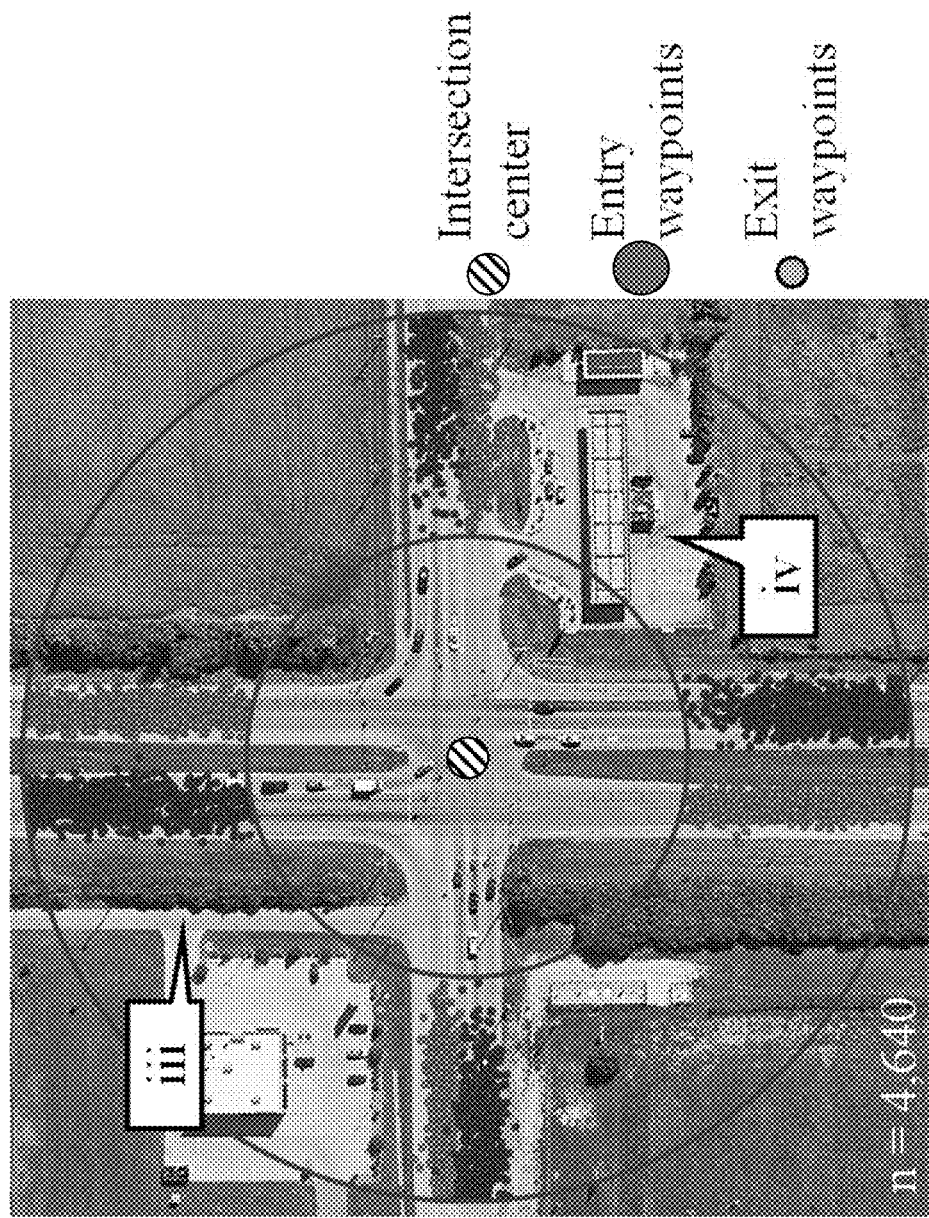

Referring to FIGS. 3a and 3b, two diagrams are provided which show the filtering impact on waypoint selection to identify valid entry and exit datapoints. In particular, FIG. 3a is a diagram which shows about 16,000 trajectory datapoints that lie within the entry and exit waypoints retrieval boundary. This set includes waypoints that do not belong to vehicles actively crossing through the intersection (callouts i and ii). FIG. 3b is a diagram which shows only the 4,640 entry and exit waypoints after applying the filtering methods explained above. Waypoints that are not entering or exiting the retrieval area or do not meet the entry/exit thresholds are discarded, thus eliminating the outliers (callouts iii and iv shown in FIG. 3b).

Figure 4A:
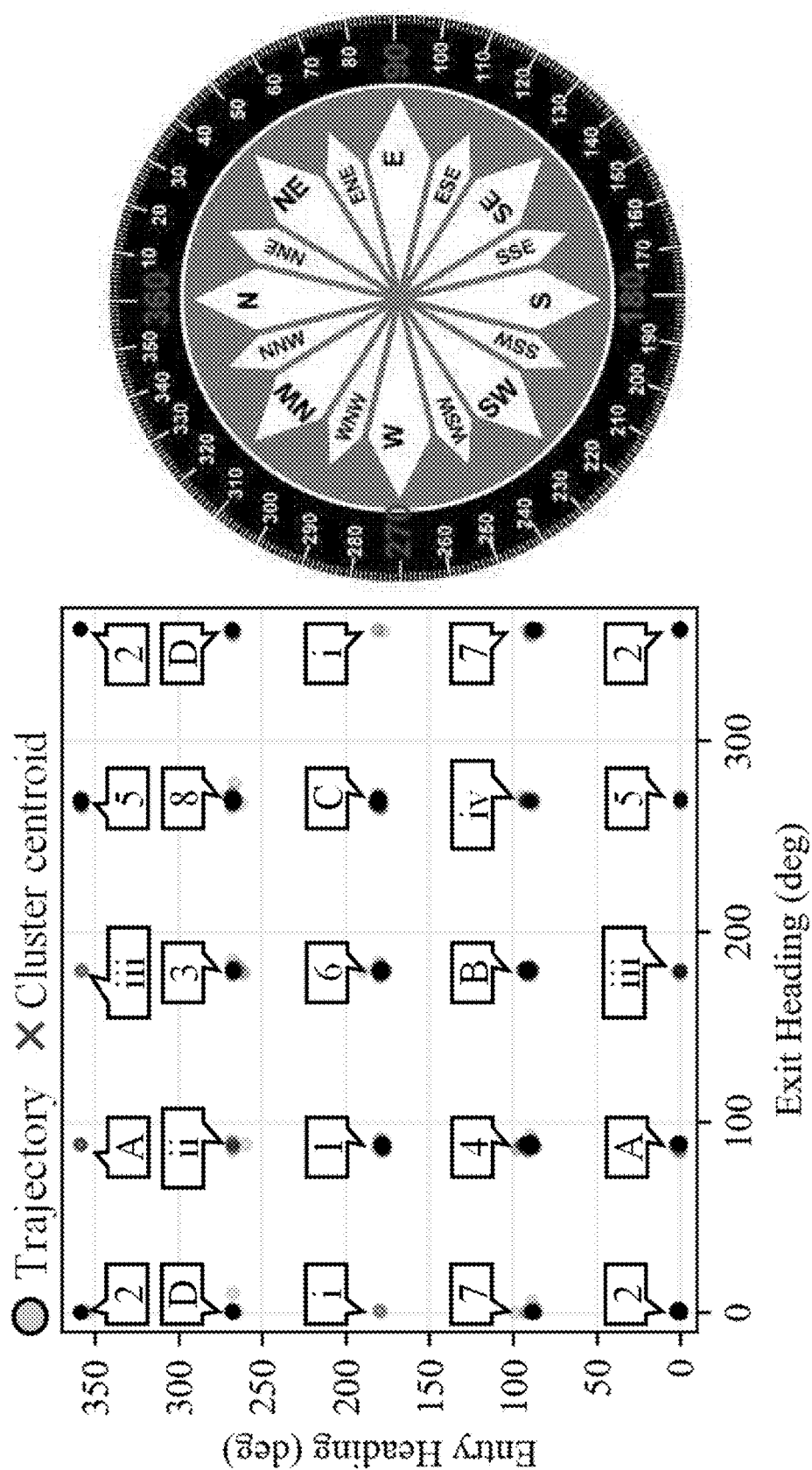
FIG. 4a is a diagram which illustrates a scatter plot of the entry and exit headings identified at the cross-section of FIG. 1a where different turning movements can be identified.

Next, turning movement clusters are identified based on the entry and exit waypoint headings. Referring to FIG. 4a, a diagram is provided which illustrates a scatter plot of the entry and exit headings identified at the cross-section of FIG. 1a. In FIG. 4a, reference 1-8 corresponds to the 1-8 movement arrows in FIG. 1a, as do reference A-D, while callouts i-iv refer to U-turns which are not shown in FIG. 1a. Movement clusters are formed when pairing these headings. By analyzing the entry headings of each trajectory (vertical axis), directions of travel can be assigned to each cluster: northbound (NB), eastbound (EB), southbound (SB), and westbound (WB). Consequently, turning movements can be assigned using the exit headings (horizontal axis) relative to the entry headings: through, left, and right. Referring to FIG. 4a, the figure also shows the movement ID references discussed with reference to FIG. 1a. For example, a vehicle approaching from the SB direction turning left will have an entry heading of 180° and an exit heading of 90° (movement ID 1 on FIG. 1a). A compass is also shown in FIG. 4a to depict the way angles progress with respect to the scatter plot.

To automate the turning movement identification process, first the number of entry-exit heading clusters is identified as well as their centroids. Vehicles performing U-turns can be eliminated if those movements are not of interest to the practitioner (callouts i to iv) on FIG. 4a. Additionally, due to slight variations in readings produced by GPS equipment and the compass value wrapping around at the 0°/360° mark, movements that have entry or exit coordinates close to the wrap-around boundary may have clusters appearing more than once. For example, movement ID 5 going from 359° entry heading to 270° exit heading (NB left) may also see some entry readings recorded at 0°, due to slight GPS variations and the heading values wrapping around after crossing the 360° mark. In these cases, the clusters are joined with the cluster with the greatest number of datapoints to facilitate further analysis using the follow method: 1) for each cluster i, find any cluster j where i≠j with entry heading j within ±20° of the entry heading of i, with consideration of the wrap around at the 0°/360° mark; 2) check if the exit heading is the same for i and j; 3) if the exit headings are the same, and the number of trajectories in i is greater than in j then add all j trajectories to i. 4) delete j. Repeat the process for all clusters, then repeat the process holding the entry heading same when comparing i and j, and match j with i using a ±20° tolerance for the exit heading. The result of the cleanup example for movement ID 5 is callout 5 shown in FIG. 4b.

The k-means method is utilized to automatically detect clusters' centroids. It should be noted that the k-means approach described below is but one such approach to automatically detect clusters' centroids; other methods known to a person having ordinary skill in the art are also available such as density-based spatial clustering of applications with noise (DBSCAN). In this method, for any set C of k clusters, and any set of centroids $m_1, \ldots, m_k$, the error sum of squares is defined as:

$$ESS(C, m_1, \ldots, m_k) = \sum_{j=1}^{k} \sum_{i=1}^{n_j} \|x_{ij} - m_j\|^2, \quad (1)$$

where $n_j$ is the number of observations in the jth cluster, and $x_{ij}$ is the ith observation in the jth cluster. The objective of k-means is to find the set C and set of centroids that would minimize ESS. To accomplish this, an initial number of k clusters is provided; then, centroids for the k clusters are calculated; finally, observations are assigned to the closest centroid. The last two steps are repeated until no observations' reassignments are required.

To select a proper value of k clusters (or k identified turning movements), the k-means algorithm is run for k values from 2 to 12, to account for all the possible movements at intersections with different number of legs up to a four-legged intersection. Additional values of k can be tested when analyzing intersections with more than 4 legs. The k value that had the highest reduction in ESS is selected for further analysis. Then, the average distance between the $n_j$ observations and the $m_j$ centroid for all the k clusters in C are calculated as:

$$\frac{\sum_{i=1}^{n_j} \|x_{ij} - m_j\|}{n_j}. \quad (2)$$

If any average distance between a centroid and its observations is greater than 10° (threshold selected by testing the method for various locations), then k is increased by one.

Figure 4B:
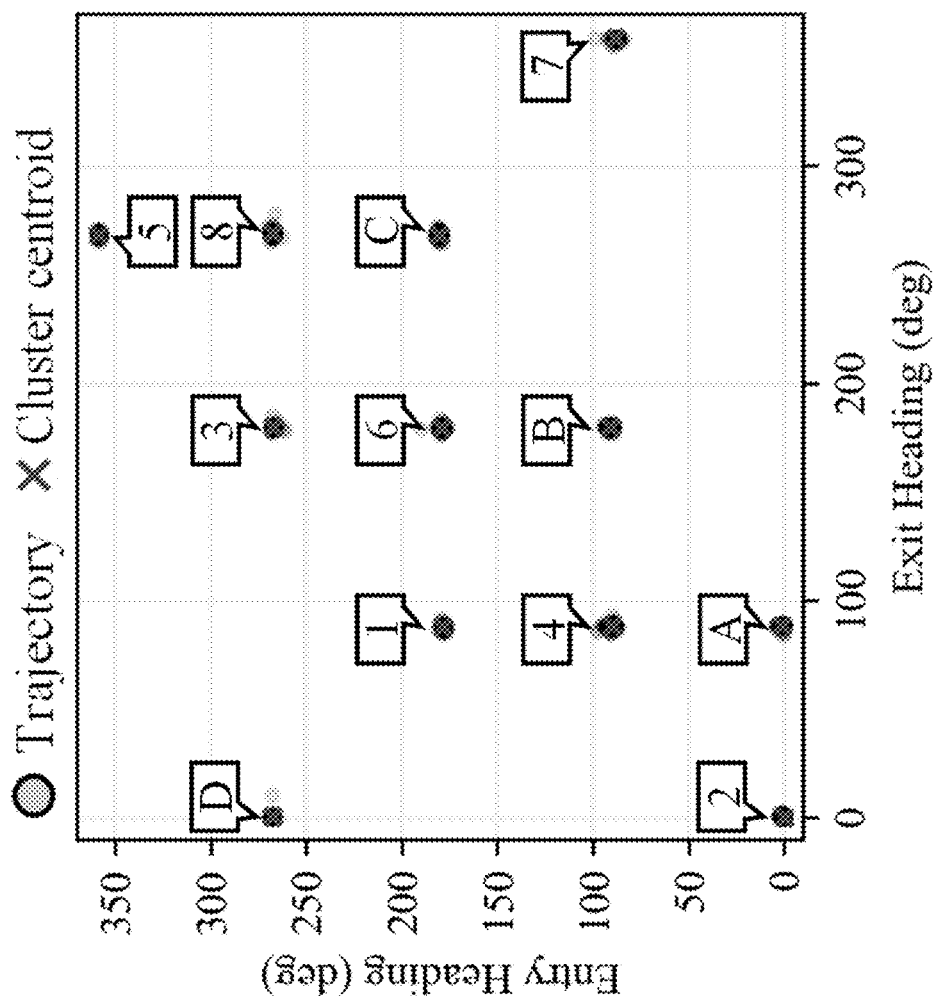
FIG. 4b is the diagram of FIG. 4a after various filters are applied.

For trajectories analyzed at the intersection of FIG. 4a, a k value of 12 was calculated, and the different cluster centroids are shown in FIG. 4b. At this point, entry and exit heading boundary limits can be assigned to the different turning movements identified at a particular location. After this is done, any new trajectory can be assigned a movement by matching the entry and exit headings. Table I shows the estimated heading limits for the 12 movements identified at this intersection.

TABLE I

Calculated entry and exit heading limits per movement at the intersection of FIG. 1a trajectories

| Movement ID | Direction | Movement | Entry Lower Limit (deg) | Entry Upper Limit (deg) | Exit Lower Limit (deg) | Exit Upper Limit (deg) | Trajectory Count |
| --- | --- | --- | --- | --- | --- | --- | --- |
| 2 | NB | Through | 0 | 3 | 0 | 2 | 607 |
| 4 | EB | Through | 87 | 98 | 85 | 93 | 239 |
| 6 | SB | Through | 177 | 190 | 176 | 184 | 521 |
| 8 | WB | Through | 263 | 271 | 265 | 278 | 230 |
| 5 | NB | Left | 357 | 359 | 265 | 271 | 89 |
| 7 | EB | Left | 84 | 99 | 355 | 359 | 110 |
| 1 | SB | Left | 177 | 181 | 85 | 91 | 74 |
| 3 | WB | Left | 261 | 269 | 177 | 185 | 52 |
| A | NB | Right | 0 | 4 | 84 | 89 | 62 |
| B | EB | Right | 89 | 95 | 177 | 182 | 84 |
| C | SB | Right | 179 | 183 | 265 | 272 | 105 |
| D | WB | Right | 265 | 270 | 0 | 10 | 78 |

With the above data, entry and exit heading boundaries for the identified turning movements at a particular location can be estimated. The next step in the trajectory movement identification process is to assign a particular turning movement to entire trajectories, as retrieved by the radii from FIG. 1b. However, at this point, movement assignments would include trajectories that trip-chained (i.e., made intermediate stops between the first entering and final exiting of the intersection, e.g., at adjacent gas stations or other businesses). To filter out trajectories that include trip-chaining, the total distance traveled by each trajectory within the selected radius is also analyzed.

Figure 5A:
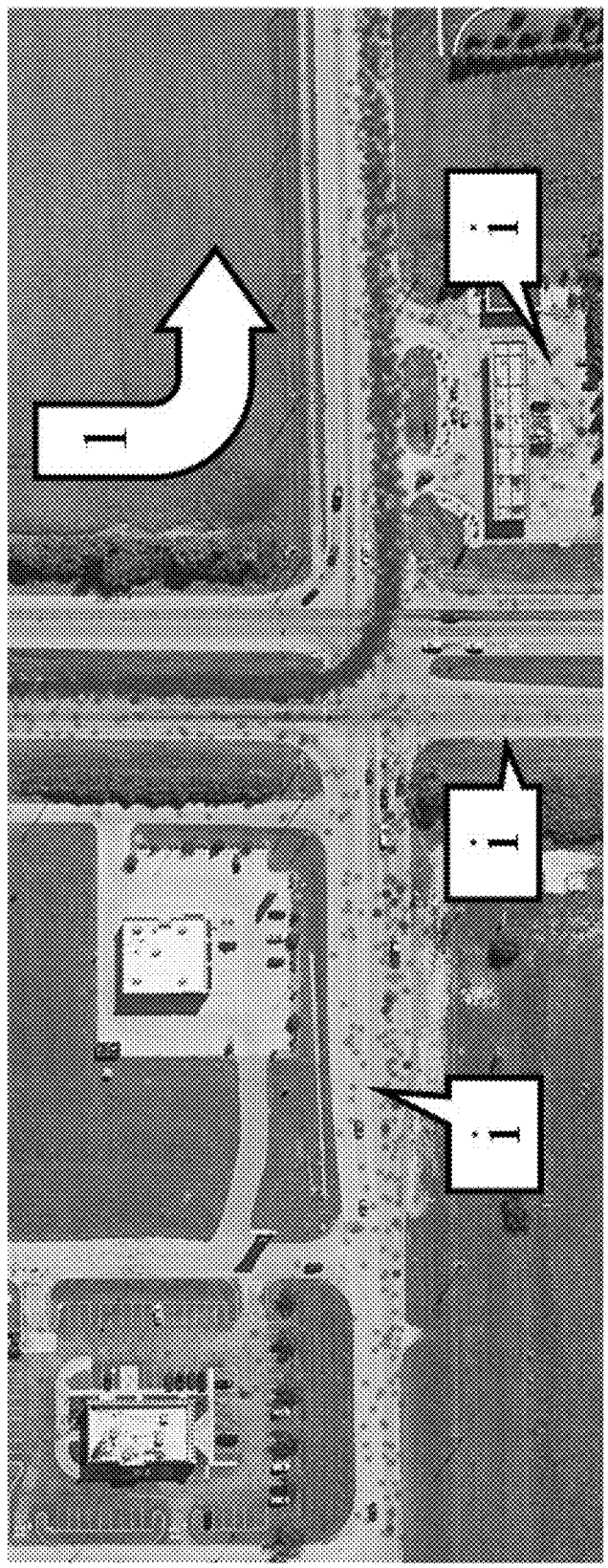
FIG. 5a is a diagram which shows all the vehicle trajectories' waypoints, selected within a 750 feet retrieval radius, assigned with turning movement #1 (SB left) by only considering the entry and exit headings.
Figure 5B:
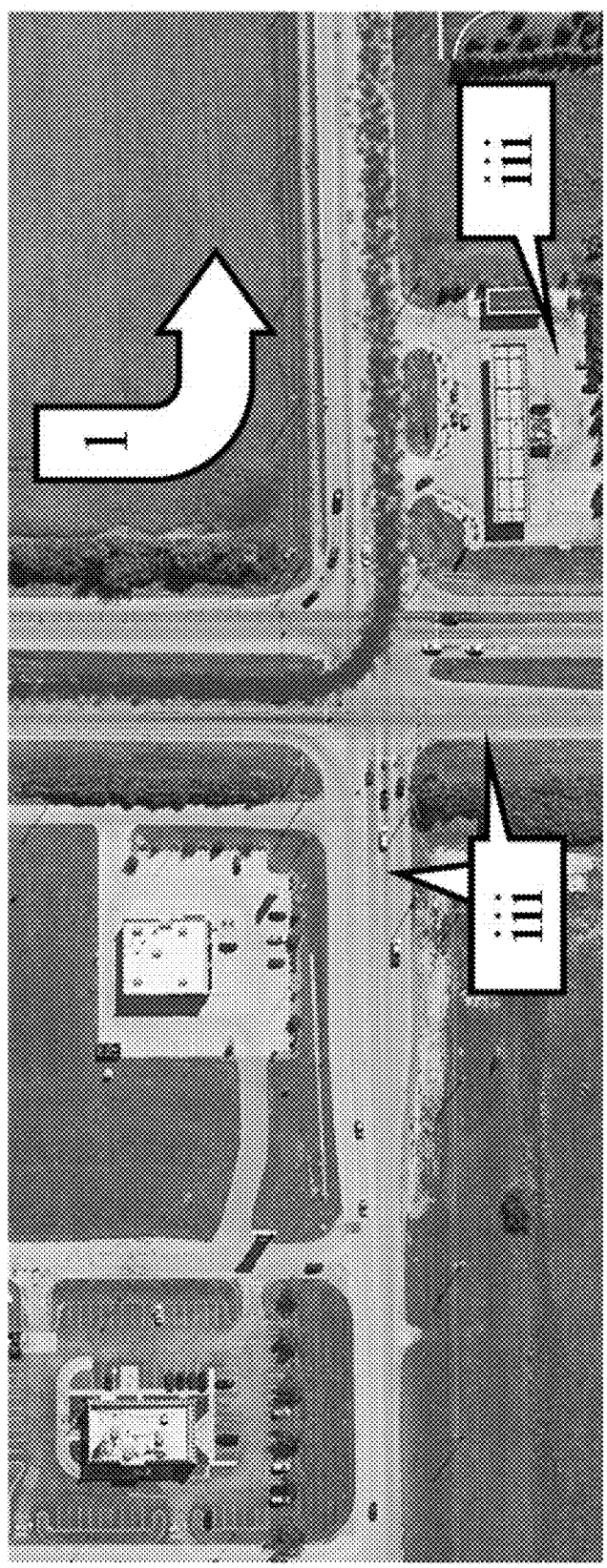
FIG. 5b is the diagram of FIG. 5a after applying a distance filter.
Figure 5C:
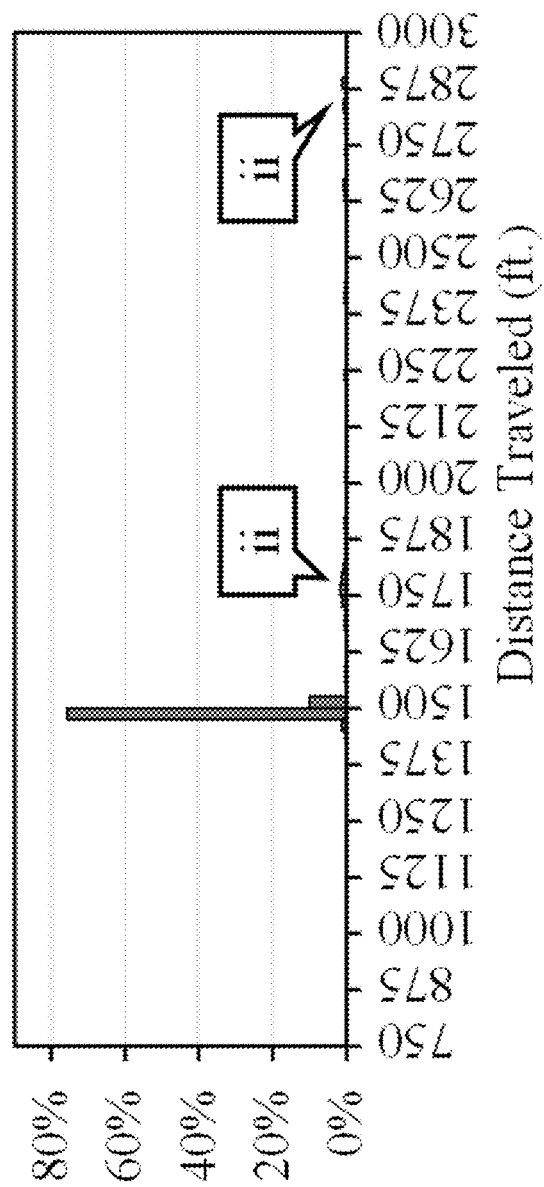
Figure 5D:
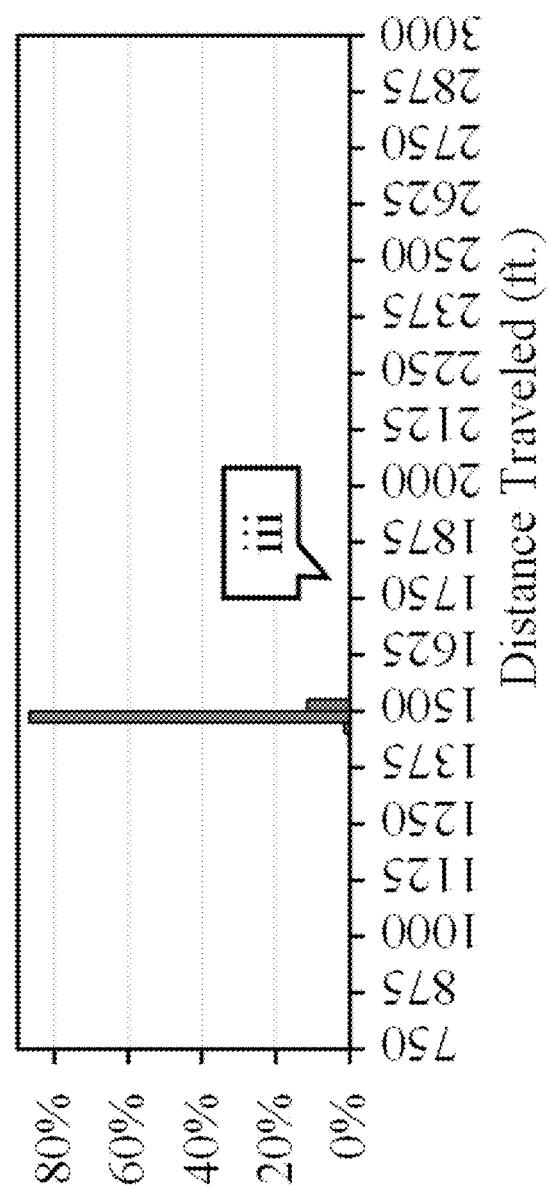
FIG. 5d is a histogram of distances traveled on FIG. 5b.

Referring to FIG. 5a, a diagram is provided which shows all the vehicle trajectories' waypoints, selected within a 750 feet retrieval radius, assigned with turning movement #1 (SB left) by only considering the entry and exit headings. Even though all trajectories first enter and finally exit the intersection from the correct approaches, some trajectories made an intermediate stop or left the intersection to later come back (callout i). The distribution of distance traveled by all the selected trajectories is shown in FIG. 5c, which is a histogram of FIG. 5a. As expected, most of the vehicles traveled a distance of around 1500 feet (twice as much as the retrieval radius) when crossing the intersection. However, clear outliers can be identified that diverged from the assigned movement (callout ii). By filtering any trajectory with a distance traveled having an absolute difference of about 50 feet (provided as an example only, other thresholds are within the ambit of the present disclosure) compared to the median, the outliers disappear (callout iii in FIG. 5b, a corollary of FIG. 5a, and FIG. 5d, a corollary of FIG. 5c), and only the trajectories that followed the assigned movement without diverging are retrieved. This is an important aspect of the presented disclosure as most analyses derived from turning movement assignment assume that the identified vehicles follow the specified movement without any trip-chaining in between.

To assess the performance of the trajectory turning movement identification method presented in the present disclosure, CV trajectories that crossed through the signalized intersection of FIG. 1a were analyzed. Various methods were considered including geofencing (used as baseline for comparison purposes). Table II shows the number of trajectories selected with a particular movement by retrieval radius and by method used. Additionally, the percentage of trajectories identified with a specific movement and direction of travel by the heading-cluster distance-unfiltered method, or the heading-cluster distance-filtered method, that match the selection by the geofencing method is shown. The matching value is calculated by dividing the number of trajectories identified with a particular movement (e.g., through) and direction of travel (e.g., NB) with either of the heading cluster methods that were also identified with the same movement and direction with the geofence method, by the total number of trajectories identified with the same movement and direction of travel by the same heading cluster method.

TABLE III

Sampled trajectories movement counts at the intersection of FIG. 1a with the heading filtered method and a 750 ft. retrieval radius

| Movement ID | Trajectory Count | Percentage of All Movements |
|---|---|---|
| 2 | 23,616 | 30% |
| 4 | 7,063 | 9% |
| 6 | 23,741 | 30% |
| 8 | 6,498 | 8% |
| 5 | 2,526 | 3% |
| 7 | 2,857 | 4% |
| 1 | 2,130 | 3% |
| 3 | 1,672 | 2% |
| A | 1,428 | 2% |
| B | 2,391 | 3% |
| C | 2,647 | 3% |
| D | 2,259 | 3% |

TABLE II

Trajectories identified with a specific movement by different methods

| | | | Number of Trajectories by Method | | Match with Geofence | |
|---|---|---|---|---|---|---|
| Retrieval Radius (ft) | Movement | Geofence | Heading Cluster Distance Unfiltered | Heading Cluster Distance Filtered | Heading Cluster Distance Unfiltered | Heading Cluster Distance Filtered |
| 250 | Through | 424,485 | 86,657 | 84,950 | 90% | 91% |
| 750 | Through | 424,485 | 458,510 | 446,110 | 87% | 88% |
| 1250 | Through | 424,485 | 458,674 | 418,137 | 87% | 88% |
| 250 | Left | 46,488 | 17,202 | 16,652 | 91% | 92% |
| 750 | Left | 46,488 | 33,931 | 31,067 | 93% | 93% |
| 1250 | Left | 46,488 | 33,938 | 28,613 | 93% | 93% |
| 250 | Right | 50,450 | 15,453 | 15,037 | 88% | 88% |
| 750 | Right | 50,450 | 33,848 | 31,067 | 97% | 98% |
| 1250 | Right | 50,450 | 33,852 | 27,767 | 97% | 98% |

Even though a higher matching percentage does not necessarily mean better results since the proposed methods can potentially identify more trajectories than with geofences, high values would still reassure the accuracy of the proposed methodology. Matching trajectories range between 87% and 98%. The longer the trajectory retrieval radius is (FIG. 1b), the more trajectories that are identified. However, as this radius increases, more trajectories are filtered based on their distance traveled, as it is more likely that vehicles will make a stop at a business within the analysis area.

A useful result for practitioners obtained from the proposed movement identification method are movement counts. Table III shows movement counts at the intersection of FIG. 1a, with a 750 feet retrieval radius (see FIG. 1b). The heaviest volumes are the mainline through movements with identifiers 2 and 6, each with 30% of the sampled trajectories at the intersection. The side-street through movements 4 and 8 follow with 9% and 8% respectively, with the heaviest turning movement, eastbound left, at 4%. Even though the trajectory counts are just a sample of vehicles that cross through the location, the distribution of movements can provide insight on which approaches have the highest demands.

The automatic movement identification technique is to facilitate automated signal green time allocation that can improve signal operations.

Figure 6A:
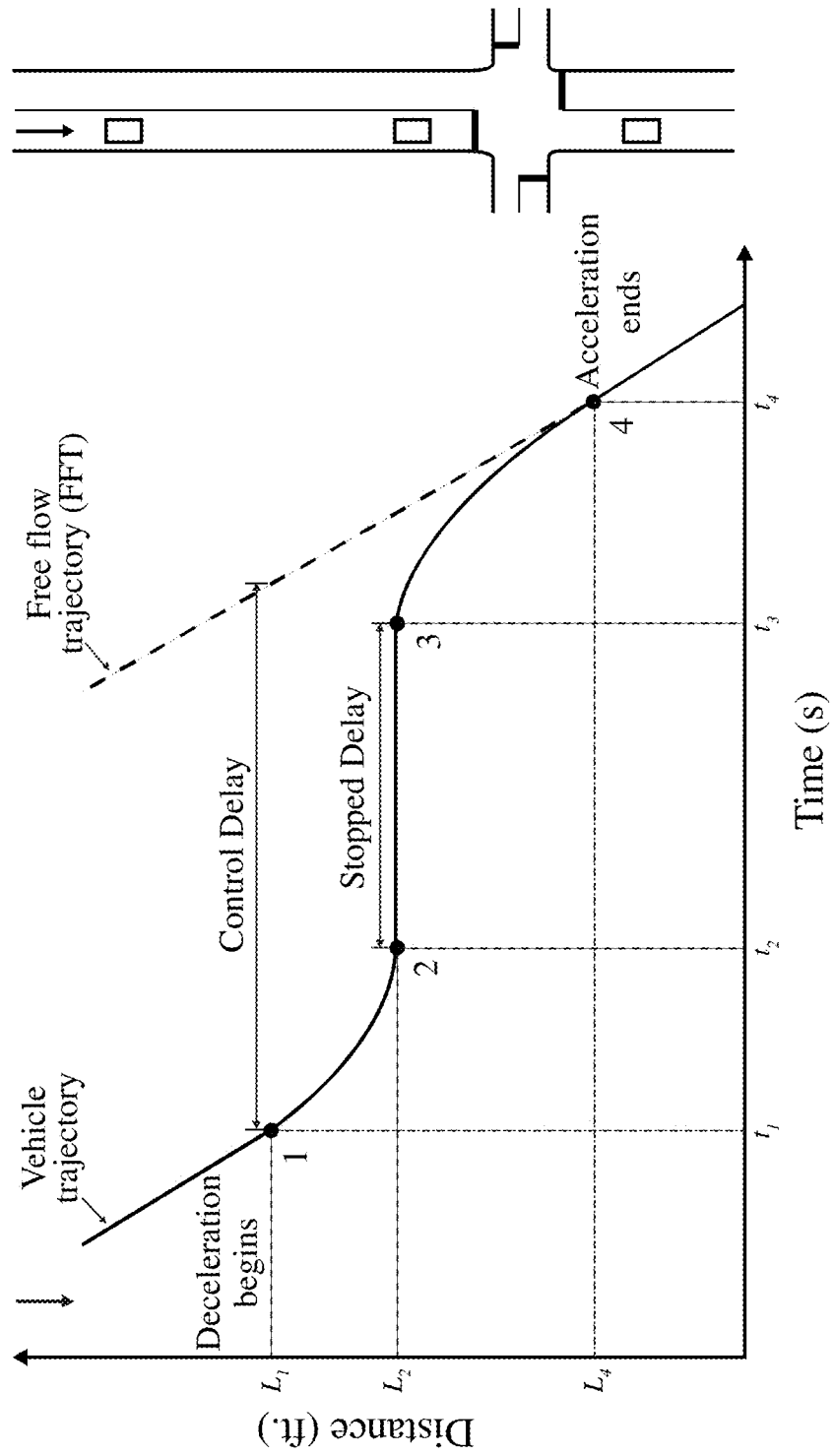
FIG. 6a is a diagram which shows delays at an intersection, according to the present disclosure.

Once a vehicle is characterized as having followed a specific movement, its trajectory can be analyzed to evaluate, among other attributes, the delay and number of stops that the vehicle experiences at the intersection. Specifically, vehicles with excessive delay or vehicles stopping more than once before crossing through the intersection are problematic operationally and should be targeted for improvement. The two definitions used to evaluate delay are stopped delay and control delay. Stopped delay is defined as the amount of time that a vehicle has a speed of zero ($t_3-t_2$) at an intersection, as shown in FIG. 6a which is a diagram which shows delays at an intersection, according to the present disclosure. Control delay includes the delay due to deceleration, the stopped delay, and the delay due to acceleration. $t_1$ is the time when the vehicle started decelerating (s), $t_4$ is the time when the vehicle stopped accelerating (s), Li is the distance where deceleration started (ft.), $L_4$ is the distance where acceleration ended (ft.), and Speed Limit is the segment's speed limit in ft./s. Delay is considered to be excessive if any vehicle cannot cross the intersection via one of its movement in one cycle (where the signal indication for the movement changes from the beginning of red, to green, back to the beginning of red again).

$$\text{Control Delay} = t_4 - t_1 - \text{Free Flow Trajectory Travel Time} \qquad (3)$$

$$\text{Free Flow Trajectory Travel Time} = \frac{L_1 - L_4}{\text{Speed Limit}}$$

If a traffic signal does not provide enough green time to allow any vehicle of a particular movement to cross the intersection in one cycle (where the signal indication for the movement changes from the beginning of red, to green, back to the beginning of red again), the movement is considered at overcapacity. In this case, the vehicle stops at least twice before crossing the intersection and it is considered to have experienced a split failure. A vehicle is considered to be stopped when its speed reaches zero.

Figure 6B:
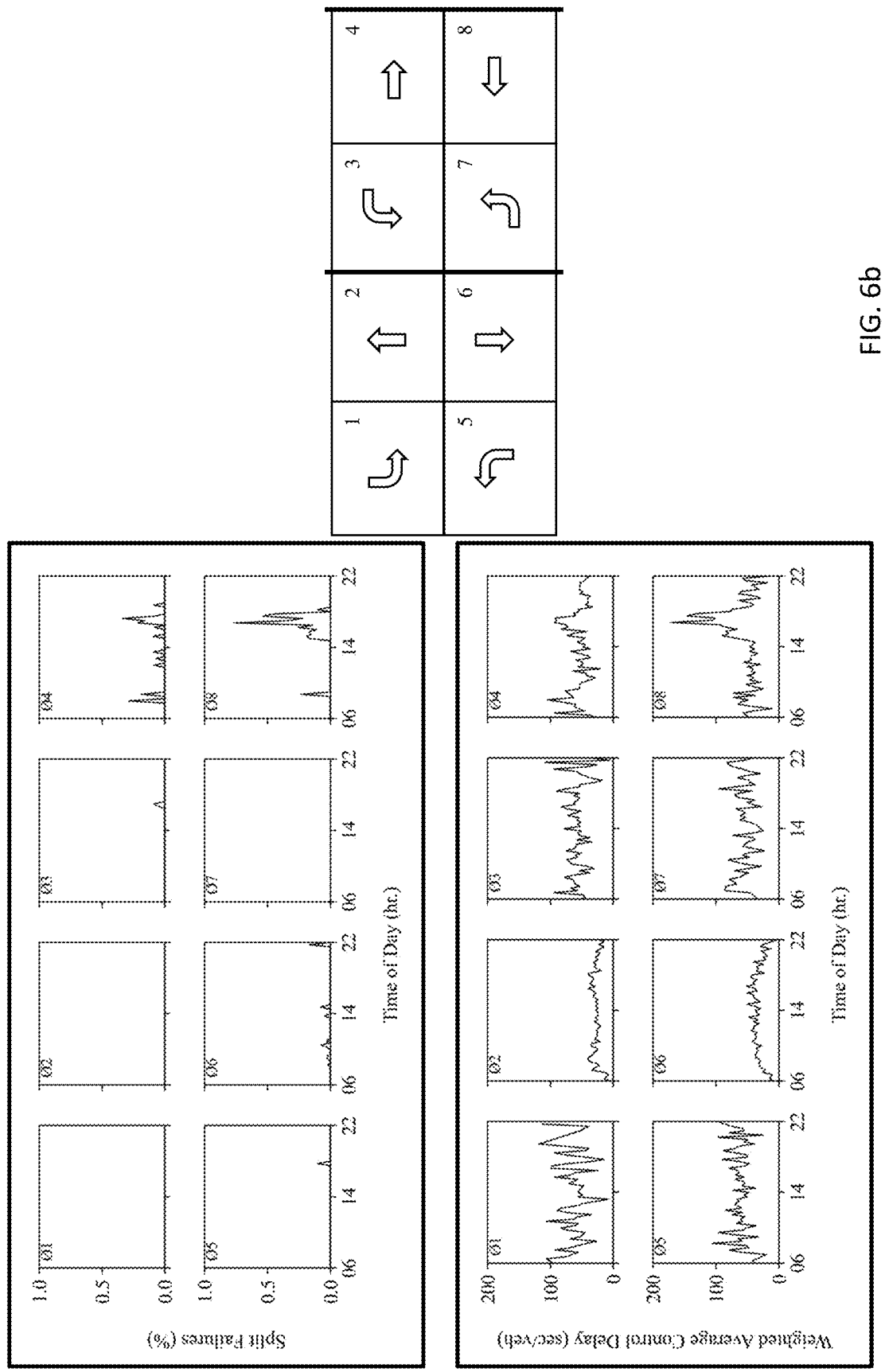
FIGS. 6b and 6c are diagrams showing green time reallocation opportunities as movement 4 (EB through) and 8 (WB through) were operating at overcapacity during the afternoon (PM) peak period (4:00-6:00 PM), while the rest of the movements were at under-capacity (FIG. 6b), and where green time was reallocated from movement 2 (NB through) and 6 (SB through) to 4 and 8 (FIG. 6c), which shows the results of the after period.
Figure 6C:
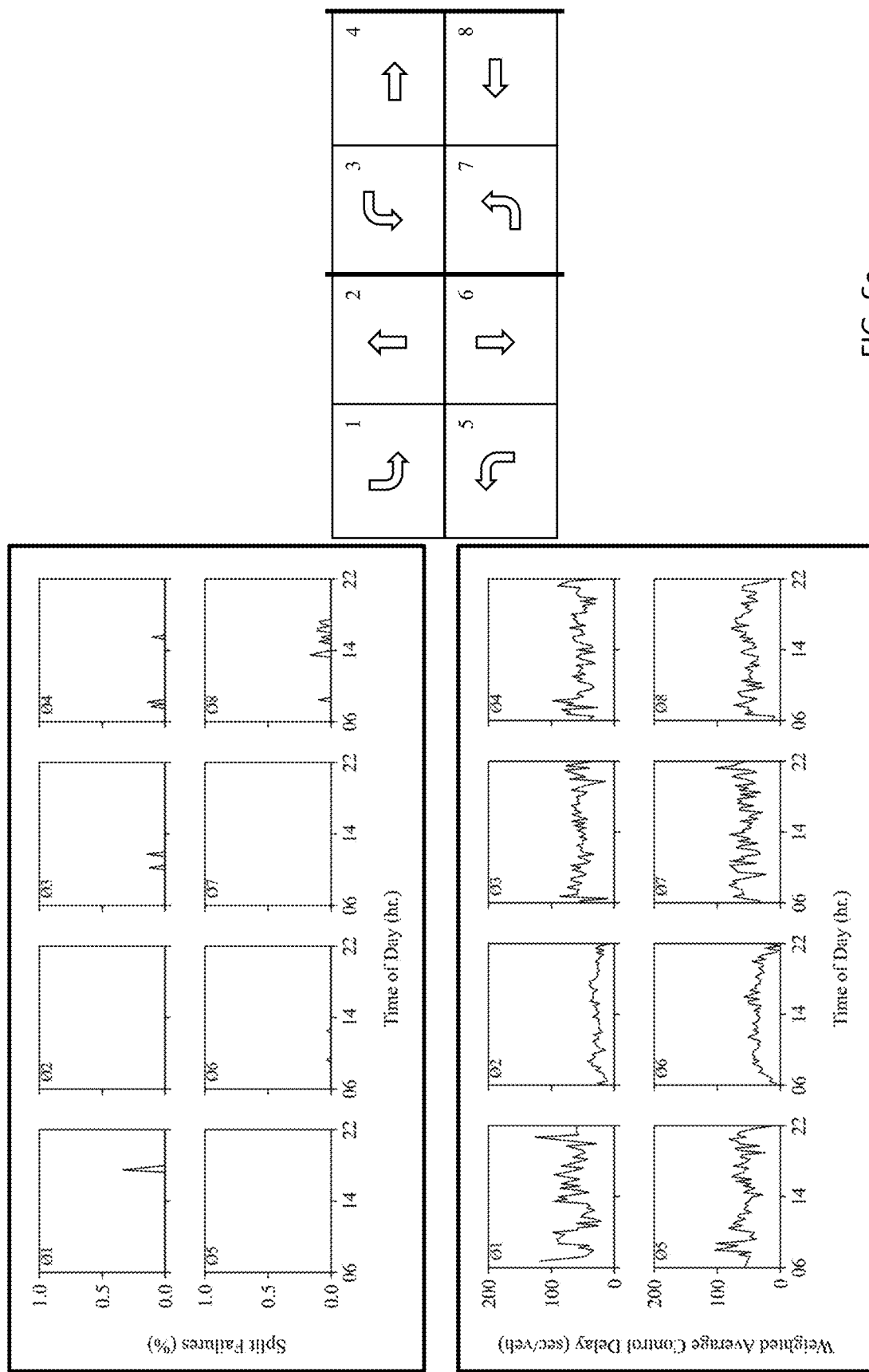

If some of the movements at an intersection are at overcapacity in either delay or number of stops while others are not (i.e. under-capacity), green time could be taken from the under-capacity (u) movements and given to the overcapacity (o) movement. The amount of time 6 that can be adjusted for cycle i is calculated by:

$$\delta_i = \begin{cases} \text{MIN}\begin{bmatrix} F(d_{oi}, g_{oi}) - t_{oi}, \\ t_{ui} - F(d_{ui}, g_{ui}) \end{bmatrix}, & t_{ui} > F(d_{ui}, g_{ui}) \\ 0, & \text{otherwise} \end{cases} \qquad (4)$$

Where d is the traffic demand,
t is the current time allocated for the movement,
g is the geometry at the movement, and
F is a function that determines the required time to serve demand d with geometry g. This approach ensures that sufficient time is left at the under-capacity movement to serve its demand. An example of the green reallocation is provided in FIG. 6b and FIG. 6c. This location was first identified as having time reallocation opportunities as movement 4 (EB through) and 8 (WB through) were operating at overcapacity (as indicated by the high split failure ratios and experienced control delay) during the PM peak period (4:00-6:00 PM), while the rest of the movements were at under-capacity (FIG. 6b). To improve operations, green time was reallocated from movement 2 (NB through) and 6 (SB through) to 4 and 8. FIG. 6c shows the results of the after period. Movement 4 showed a reduction in number of vehicles making two or more stops by 100%, and movement 8 shows reduction of 86% for the PM peak period (4:00-6:00 PM). The delay experienced on movement 2 and 6 was not significantly affected.

Figure 7:
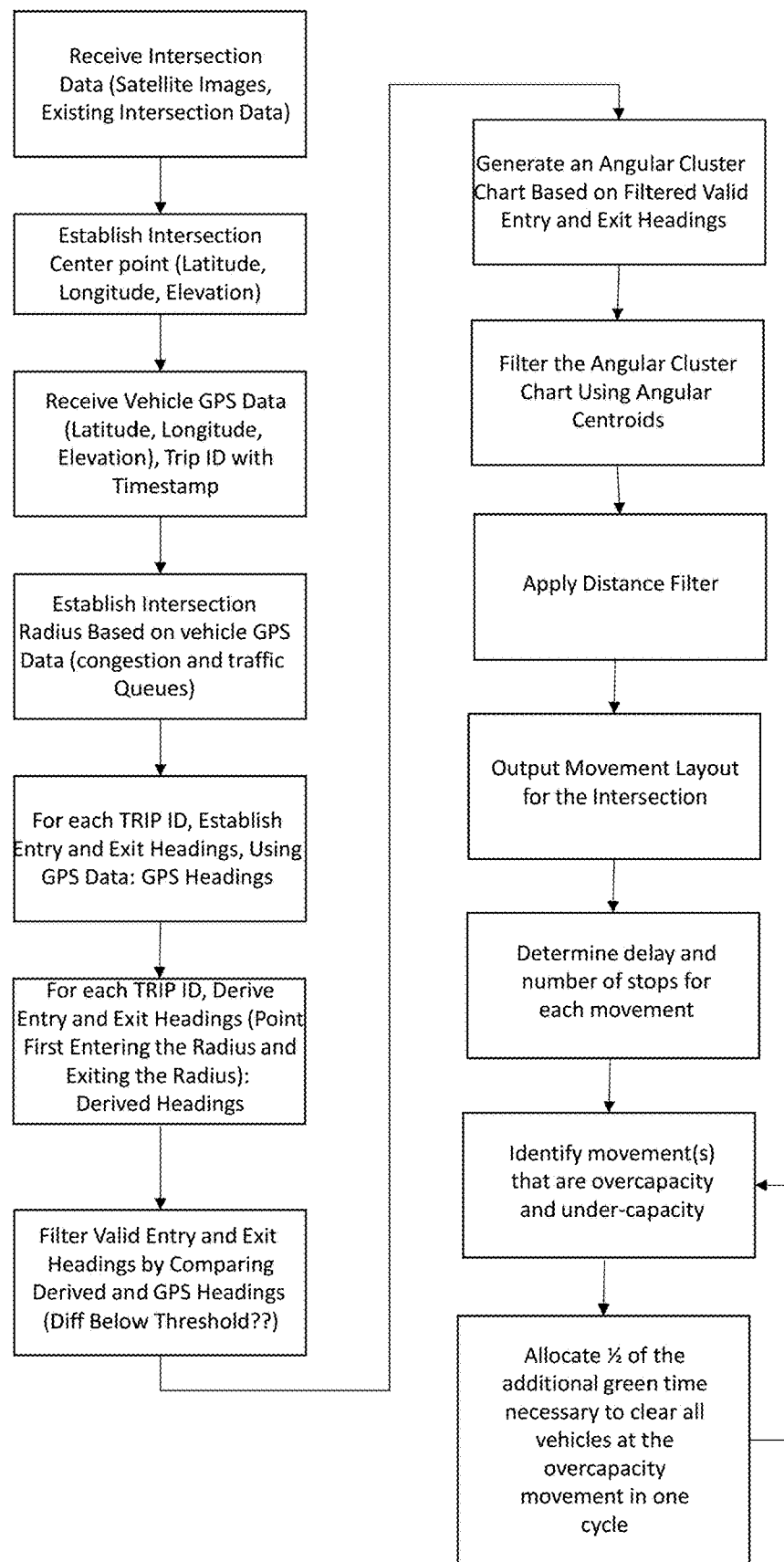
FIG. 7 is a flowchart to better elucidate the steps of the approach of the present disclosure in order to automatically generate output movement layout of an intersection.

Referring to FIG. 7, a flowchart is provided to better elucidate the steps of the approach of the present disclosure in order to automatically generate output movement layout of an intersection. The steps in the flowchart are to be executed by a computer having a processor and memory housing software that is based on the flowchart. The flowchart begins by receiving an intersection data (e.g., the intersection shown in FIG. 1a). This data can be generated from satellite imaging, or from an existing governmental database. Next the center point of the intersection is established based on the aforementioned data. The center point data includes latitude, longitude, and altitude of the center point (for example, the center point of the intersection may be raised when the intersection is an elevated intersection, i.e., an intersection over a roadway or another intersection). Next, the method receives vehicle GPS data indicating a vehicle's latitude, longitude, altitude, trip identification (ID) all with timestamps. It should be appreciated that Connected Vehicle (CV) data can be any information that a vehicle produces that is communicated from the vehicle. GPS data is a type of CV data. Next, the method includes establishing an intersection radius (i.e., a radius of concern—vehicle data outside the radius is of no concern for the output of the method). The radius of concern of the intersection is established by automatically reviewing congestion data (e.g., vehicular speed approaching the intersection center point, how far the vehicles begin to slow down, as well as optionally satellite imaging data). It should be appreciated that the circle of interest is automatically established based on time-of-day, which at some points during course of a day may indicate a larger circle and at some other points, a smaller circle (see FIG. 1b).

Next, the method for each trip ID establishes a GPS-based entry and exit heading based on a vehicle's GPS data. This involves monitoring the vehicle's GPS data and establish GPS-based vectors associated with the vehicle's movements. Next, entry and exit heading headings are also derived. This derivation includes establishing a first point associated with when a vehicle first enters the circle of interest and a second point associated with when the vehicle exists the circle of interest. Two vectors are thus defined, each between the first point and the established intersection center point and the established intersection center point and the second point. Each vector includes an associated direction. Next, the method validates consistency between GPS-based vectors (directions) and the derived vectors (directions) for the vehicles entry and exit headings. If the difference between these directions is less than a predetermined threshold, the method validates the entry and exit headings. If outside of the predetermined threshold, then the data is discarded for that vehicle. Next, the method generates an angular cluster chart associated with entry headings and exit headings both in degrees. The chart is then filtered to remove substantially close angles to each angular centroid (e.g., there may be a number of points near 0°, e.g., 355°, 357°, 358°, 0°, 2°, and 5°, all of these can be filtered into the centroid 0°). The degree about a centroid where the cluster is formed is predetermined. Next, the method applies a distance filter. The distance filter compares the GPS-data providing a distance travelled after a vehicle has entered the circle of interest until the vehicle has exited the circle of interest. The calculated distances of all considered vehicles is evaluated to filter outliers. If the distance travelled by a vehicle differs from the median by a predetermined threshold, then it will be deemed that the vehicle had made an unscheduled stop around the intersection, and thus the vehicle's data will be discarded. Once the distance filter is applied, the output of the filter represents the output of the method in the form of output measurement layout of the intersection.

It should be appreciated that the most common intersections are 4-legged with 12 different turning movements, as shown in FIG. 1a. However, there are variations that in some cases there are less than 12 movements (e.g., 3-legged intersections), and in some cases, 5-legged intersections. Intersections with 5 legs have some additional movements. The novel approach described herein can easily be applied to such variants. More generally, the novel arrangement of the present disclosure can be configured to identify movements at any n-legged intersection that uses a center as a pivot. Additionally, movements can be identified at any location, not only at intersections with traffic lights (e.g., 4-way stops, un-signalized intersections, etc.).

When the movement layout for the intersection has been created, determine the delay and number of stops of vehicles making each movement. Identify one or more movements that are overcapacity and identify one or more movements that are under-capacity. If possible, reallocate green time from the movement(s) that are under-capacity to the movement(s) that are overcapacity by the minimum between the amount of time that is needed by the overcapacity movement and the time not utilized by the under-capacity movement. Repeat the operation until no more vehicles are remaining in a cycle in the overcapacity movement. If there are no under-capacity movements at the intersection, or if the reallocation results in creating an overcapacity situation at an under-capacity movement, terminate the reallocation.

If the green time for the movement that is under-capacity is allocated using a device, sensor, or any other vehicle detection apparatus which terminates green time for that movement when a vehicle is no longer detected, green time is not reallocated from that movement.

Those having ordinary skill in the art will recognize that numerous modifications can be made to the specific implementations described above. The implementations should not be limited to the particular limitations described. Other implementations may be possible.

The invention claimed is:

1. A method of generating an output movement layout for a traffic intersection, comprising:
   receiving intersection geographical data;
   establishing a center point for a traffic intersection;
   receiving connected vehicle (CV) data from vehicles approaching and within the traffic intersection based on a predetermined distance from the center point;
   establishing an area of interest for the traffic intersection based on the received CV data;
   establishing entry and exit headings for each vehicle based on the CV data;
   generating directional groups based on the entry and exit headings of each vehicle; and
   generating an output movement layout for the traffic intersection based on the generated directional groups.

2. The method of claim 1, wherein the received traffic intersection geographical data includes:
   satellite images;
   predetermined information including pre-established traffic intersection database data; and
   satellite information provided by satellite systems.

3. The method of claim 1, wherein the traffic intersection center point includes longitude, latitude, and altitude data.

4. The method of claim 1, wherein the vehicle CV data includes at least longitude and latitude data.

5. The method of claim 4, wherein the vehicle CV data further includes altitude data.

6. The method of claim 1, wherein the area of interest is established based on traffic data associated with vehicle CV data including speed of vehicles approaching the center point.

7. The method of claim 1, wherein the entry and exit headings are established based on i) CV-based, where directionality of vehicles are based on the CV data, and ii) derived headings, where two vectors are established when a vehicle first enters the circle of interest (first point), defined as a vector between the first point and the center point, and when the vehicle exits the circle of interest (second point), defined as vector between the center point and the second point.

8. The method of claim 7, wherein the entry and exit heading directionalities between the CV-based headings and the derived headings are compared and if the difference therebetween is less than a predetermined threshold, entry and exit headings associated with the vehicle is maintained, otherwise, the associated data is discarded.

9. The method of claim 1, wherein the data of the directional groups is filtered about centroids associated with angular data of the traffic intersection.

10. The method of claim 9, wherein the filtering uses a clustering or a grouping technique.

11. The method of claim 9, further comprising:
    applying a distance filter to the filtered directional groups, wherein the distance filter compares distances travelled by all considered vehicles where if the comparison is outside of a predetermined distance threshold from the median, the vehicle data is discarded.

12. The method of claim 1, wherein the traffic intersection is an n-legged traffic intersection, where n is between 2 and 6.

13. The method of claim 1, further comprising:
    utilizing the output movement layout to estimate traffic signal performance measures, including vehicle delay and number of stops, and provide vehicle turning counts.

14. A method of automatically reallocating green time between different movements for a traffic light in a traffic intersection, comprising:
    receiving traffic intersection geographical data;
    establishing a center point for the traffic intersection;
    receiving connected vehicle (CV) data from vehicles approaching and within the traffic intersection based on a predetermined distance from the center point;
    establishing an area of interest for the traffic intersection based on the received CV data;
    establishing entry and exit headings for each vehicle based on the CV data;
    generating direction groups based on the entry and exit headings of each vehicle;
    generating an output movement layout for the traffic intersection based on the generated directional groups;
    identifying overcapacity or under-capacity state for each generated output movement thereby determining delay and number of stops for each vehicle in the traffic intersection; and
    reallocating green time between movements on a traffic light at the traffic intersection to reduce congestion and minimize vehicles during one cycle of the traffic intersection traffic lights based on any under-capacity movement at the traffic intersection.

15. The method of claim 14, wherein the area of interest is established from:
    traffic data associated with CV data including speed of vehicles approaching the center point, satellite images, or predetermined information.

16. The method of claim 14, wherein the entry and exit headings are established based on i) CV-based, where directionality of vehicles are based on the CV data, and ii) derived headings, where two vectors are established when a vehicle first enters the circle of interest (first point), defined as a vector between the first point and the center point, and when the vehicle exits the circle of interest (second point), defined as vector between the center point and the second point.

17. The method of claim 16, wherein the entry and exit heading directionalities between the CV-based headings and the derived headings are compared and if the difference therebetween is less than a predetermined threshold, entry and exit headings associated with the vehicle is maintained, otherwise, the associated data is discarded.

18. The method of claim 14, wherein the data of the directional groups is filtered about centroids associated with angular data of the traffic intersection.

19. The method of claim 18, further comprising:
    applying a distance filter to the filtered directional groups, wherein the distance filter compares distances travelled by all considered vehicles where if the comparison is outside of a predetermined distance threshold from an associated median, the vehicle data is discarded.

20. The method of claim 14, wherein the green time is allocated by a cloud service.

21. The method of claim 14, wherein the green time is determined by a sensor that detects the presence of a vehicle.

22. The method of claim 14, wherein the green time is communicated wirelessly to a vehicle.

23. The method of claim 14, wherein the vehicle is guided autonomously through the traffic intersection when green time occurs.

24. The method of claim 14, wherein the traffic intersection is an n-legged traffic intersection, where n is between 2 and 6.

* * * * *